United States Patent [19]

Rowlands et al.

[11] Patent Number: 4,470,255

[45] Date of Patent: Sep. 11, 1984

[54] POWER GENERATION PLANT

[75] Inventors: William B. M. Rowlands, Chelwood Gate; Derek G. Pattle, Southgate; Peter T. Hilliard, Horsham, all of England

[73] Assignee: Fluidised Combustion Contractors Limited, East Grinstead, England

[21] Appl. No.: 364,861

[22] PCT Filed: Aug. 18, 1981

[86] PCT No.: PCT/GB81/00164

§ 371 Date: Mar. 24, 1982

§ 102(e) Date: Mar. 24, 1982

[87] PCT Pub. No.: WO82/00701

PCT Pub. Date: Mar. 4, 1982

[30] Foreign Application Priority Data

Aug. 18, 1980 [GB] United Kingdom ................. 8026816
Oct. 31, 1980 [GB] United Kingdom ................. 8035150

[51] Int. Cl.$^3$ ................................................ F02C 3/28
[52] U.S. Cl. ................................ 60/34.12; 60/39.182
[58] Field of Search ............ 60/39.12, 39.182, 39.464; 122/4 D; 431/7, 170

[56] References Cited

U.S. PATENT DOCUMENTS

| | | | |
|---|---|---|---|
| 2,818,049 | 12/1957 | Blaskowski et al. | 60/39.182 |
| 3,784,676 | 1/1974 | Moss | 122/4 D |
| 3,978,657 | 9/1976 | Fulton et al. | 60/39.12 |
| 3,986,348 | 10/1976 | Switzer | 60/39.182 |
| 4,103,646 | 8/1978 | Yerushalmi et al. | 122/4 D |
| 4,160,009 | 7/1979 | Hamabe | 122/4 D |

*Primary Examiner*—Louis J. Casaregola
*Attorney, Agent, or Firm*—Kemon & Estabrook

[57] ABSTRACT

A recirculating fluidized bed furnace (FIG. 3) having a combustion chamber 4 operating at a fluidization velocity of 10 meters per second delivering combustion products to a separating section 10 with the combustion gases flowing over boiler banks 30-36 in a pass 30 and the solids particles falling to a weir chamber 14. Heat is extracted from the particles in a compartmented heat transfer bed space 20 operating at a fluidization velocity of 0.5 meters per second receiving the particles from the weir chamber 14 and discharging them to the base of the combustion chamber 4.

The furnace is combined with a coal devolatilizer 60 discharging combustible gases through a burner 68 to a gas turbine 70 and char to the furnace combustion chamber 4. A compressor 72 coupled to the gas turbine 70 delivers air to an air heater 74 in the heat transfer bed space 20, which heated air is supplied to the devolatilizer 60 and the burner 68.

9 Claims, 3 Drawing Figures

POWER GENERATION PLANT

DESCRIPTION

This invention relates to fluidised bed furnaces and to a power generating plant including a fluidised bed furnace.

According to one aspect of the invention there is provided a fluidised bed furnace including, connected in a circulatory arrangement, a combustion chamber section, a separating section and a heat transfer bed space section, the combustion chamber section being arranged to be supplied with fuel particles and fluidising gases at a relatively high velocity and discharge combustion products to the separating section, the separating section being arranged to effect separation of solids particles from combustion gases in the combustion products and discharge the solids particles to the heat transfer bed space section and the combustion gases from the furnace and the heat transfer bed space section being arranged to be supplied with fluidising gases at a relatively low velocity to effect flow of the solids particles around heat transfer surfaces and discharge to the combustion chamber section.

According to another aspect of the invention there is provided power generation plant including the fluidised bed furnace and a coal devolatilisation unit, the coal devolatilisation unit being connected to receive air from an air heater arranged to derive heat from the fluidised bed furnace and to discharge combustible gases to burner means connected to a gas turbine and the fluidised bed furnace being connected to receive char from the coal devolatilisation unit and exhaust gas from the gas turbine, and being provided with vapour generating and vapour heating surfaces in a heat transfer bed space of the fluidised bed furnace and in a combustion gas pass connected to discharge vapour to a vapour turbine.

The invention will now be described, by way of example, with reference to the accompanying diagrammatic drawings, in which.

Figure 1:
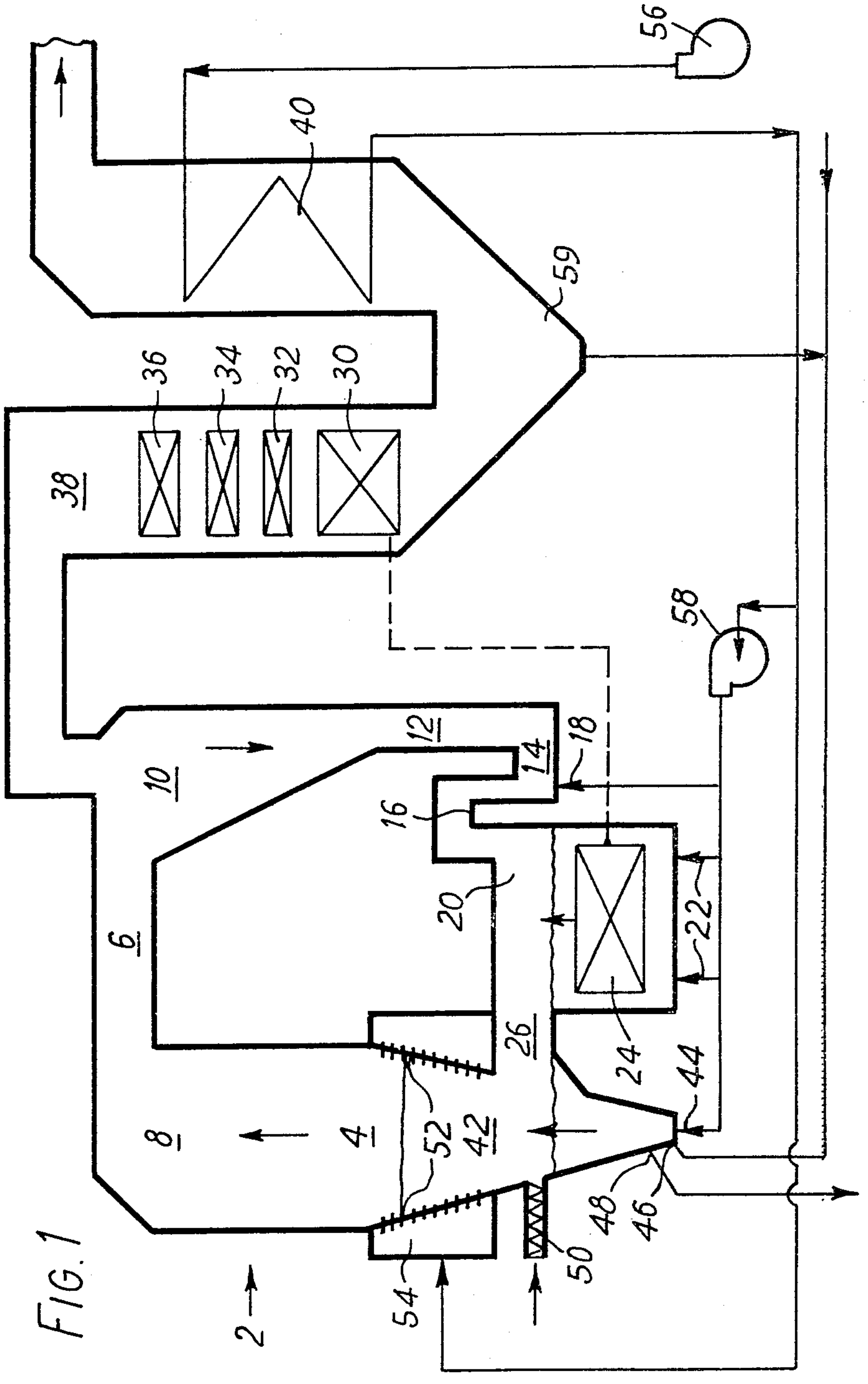
FIG. 1 is a representation of a fluidised bed combustor together with a steam generating and heating unit.

As shown in FIG. 1, the fluidised bed combustor 2 includes an upright, refractory lined, combustion chamber 4 discharging through a lateral duct 6 from an upper region 8 to a separation region 10. A particulate solids return duct 12 extends downwardly from the separation region 10 to a weir chamber 14 having a weir plate 16 and, adjacent the weir plate, spaced fluidising air nozzles 18. The weir chamber 14 discharges, over the weir plate 16, to a heat transfer bed space 20 formed as parallel extending compartments by vertical partitions each provided with spaced fluidising air nozzles 22 and heat exchange tube banks 24. Particle recirculation ducts 26 lead from the bed space 20 to the combustion chamber 4.

The heat exchange tube banks 24 in the bed space 20 form a part of the flow circuit of a forced flow steam generating and superheating unit, the remaining tube banks 30, 32, 34 and 36 of which are positioned in a combustion gas pass 38 leading from the separation region 10. The flow circuit of the unit also includes tube lengths (not shown) lining the walls of the bed space 20 and the combustion gas pass 38. An airheater 40 is positioned in the combustion gas pass 38 downstream, in the gas flow path, of the tube bank 30 and the pass is connected to discharge, through a bag filter and induced draught fan, to a stack (all not shown).

The combustion chamber 4 is formed with a convergent base 42 provided with primary fluidising air nozzles 44, an inlet 46 for dust particles collected from the combustion gas pass 38 and the bag filter and an outlet 48 for ash particles. A screw feeder 50 for coal particles is positioned adjacent the level of the particle recirculation ducts 26 whilst secondary fluidising air nozzles 52 extend through the convergent base wall from a windbox 54 superjacent the screw feeder 50.

In operation, combustion is initiated in the combustion chamber 4 by utilising an oil burner (not shown) to heat up material in the base of the combustion chamber to about 700° C., fluidising air to achieve a fluidisation velocity of about 0.5 meters per second being supplied through the primary nozzles 44. Upon coal ignition temperature being reached in the fluidised material, coal particles are added through the screw feeder 50 at a rate sufficient to establish self-sustaining combustion in the bed, at which stage the use of the oil burner is discontinued. As the temperature of the fluidised material rises so the supply of coal particles and fluidising air is increased until a temperature of about 850° C. is achieved, at which stage secondary fluidising air is supplied through the windbox 54 and secondary air nozzles 52 to achieve a fluidisation velocity of about 3 meters per second. A stream of combustion gases, ash, and unburnt particles from the combustion chamber 4 is discharged through the lateral duct 6 to the separation region 10 where a substantial fraction of the ash and unburnt particles separate out from the stream to fall into the particulate solids return duct 12, and the combustion gases are discharged through the combustion gas pass 38. The ash and unburnt particles gravitate to the base of the return duct 12 and into the weir chamber 14. Upon the rate of deposition of particles in the return duct 12 reaching a rate sufficient for recirculation to be initiated, fluidising air is supplied to those of the nozzles 18 associated with a selected compartment of the bed space 20 to cause the particles to flow over the associated portion of the weir plate 16 into the compartment, and thence through the return duct 26 to the combustion chamber 4. As the rate of flow and temperature of the particles increases so those of the fluidising air supply nozzles 22 associated with the selected compartment are brought into action to produce a fluidised heat transfer bed in the compartment to enhance transfer of heat from the particles to evaporator tube lengths extending through the compartment. The rates of supply of coal, fluidising air and water to the tube banks are then progressively increased to full load conditions at which fluidising velocities of between 9 and 13 meters per second obtain at the upper end of the combustion chamber and of between about 0.5 and 1.0 meters per second obtain at the bed space 20. Limestone sorbent is supplied, as appropriate, through inlets 22 discharging to the bed space 20.

The combustion gases are discharged from the separation region 10 to the combustion gas pass sequentially to flow over the evaporator tube banks 36, 34, 32 and the economiser tube bank 30 to a turning space 59, where further ash particles—carried over from the separation region—are deposited. The combustion gases then flow, over the airheater 40, to the bag filter and induced draft fan for discharge to the stack. Ash particles from the turning space 59 and the bag filter are returned through ducting to the combustion chamber 4 through the ash return nozzles 46.

Air is supplied through a forced draft fan 56 to the airheater. Air from the airheater is supplied to the windbox 54 and, through a booster fan 58, to the fluidising air nozzles 18, 22 and 44. Spent ash is discharged from the combustion chamber 4 through the outlet 48.

By combining the combustion chamber 4 operating with a relatively high fluidisation velocity with the compartmented bed space 20 operating at relatively low fluidisation velocity a very flexible system is achieved with good combustion conditions in the combustion chamber 4 and good heat transfer conditions in the bed space 20. To operate at low loads, or without superheating, the supply of fluidising air to appropriate compartments in the bed space is discontinued, allowing the bed to slump, thereby restricting heat transfer. At loads at which combustion will not be sustained by the input of coal particles, the oil burner may be utilised as a supplementary heat supply to the circulating particles.

Figure 2:
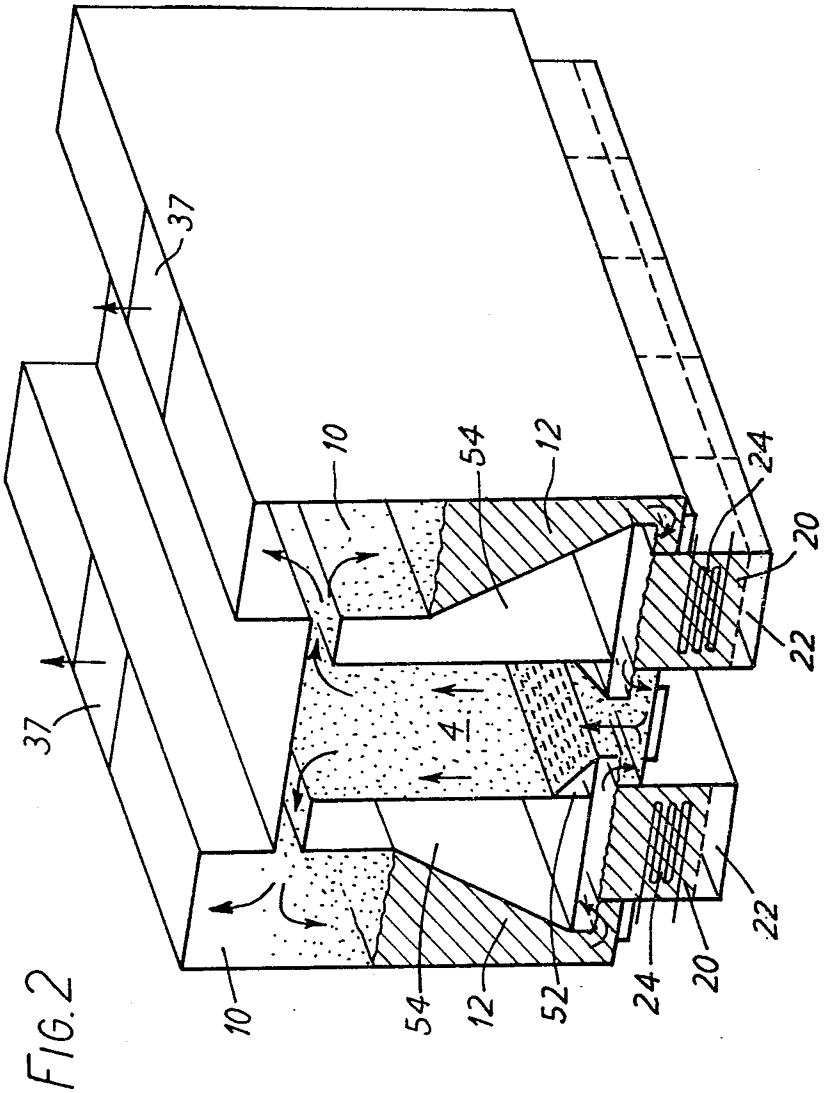
FIG. 2 is an isometric representation of a form of fluidised bed combustor.

As shown in FIG. 2, separation regions 10 and particulate solids return ducts 12 may be positioned to two sides of the combustion chamber 4 to discharge combustion gases through outlets 37 to the combustion gas pass 38. The ducts 12 deliver particulate material to compartmented weir chambers 14 and bed spaces 20 discharging to the base of the combustion chamber 4. This achieves a very compact arrangement, with the space between the combustion chamber 4 and the return ducts 12 serving as the wind box 54.

Figure 3:
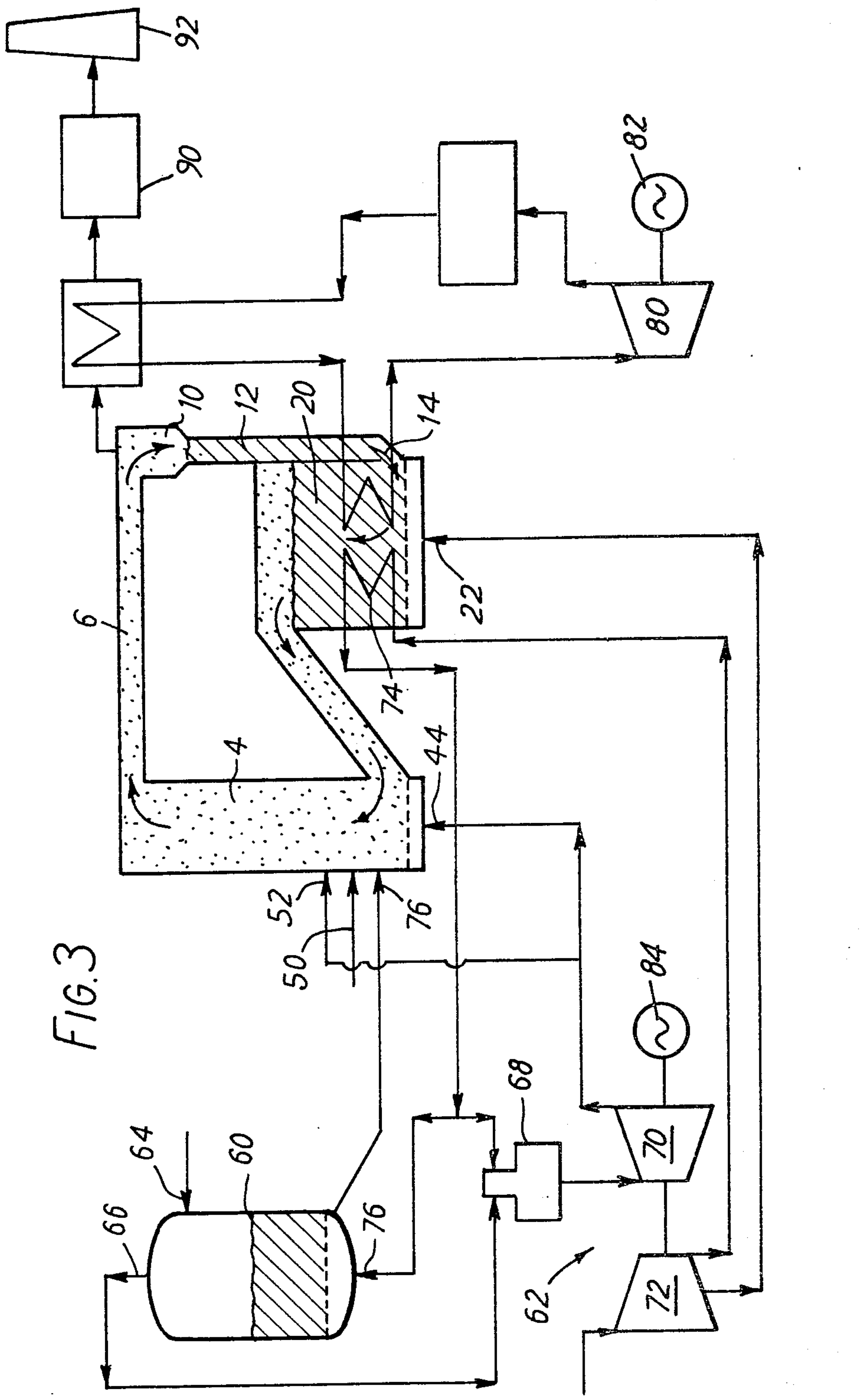
FIG. 3 is a representation of the combustor in conjunction with gas turbine and coal devolatilisation plants.

Referring to FIG. 3, the combustor 2 is utilised in conjunction with a devolatiliser 60 and a gas turbine unit 62. The devolatiliser is connected to receive coal through an inlet 64 and discharges hot combustible gases through an outlet 66 and burner 68 to a gas turbine 70 coupled to a compressor 72. The compressor is connected to discharge compressed air at a relatively high pressure to an air heater tube bank 74 positioned in the bed space 20 of the combustor 2 and, at a relatively lower pressure to the fluidising nozzles 22. The air heater tube bank 74 is connected, through valves (not shown) both to an air inlet 76 to the devolatiliser 60 and to the burner 68.

The gas turbine 70 discharges to the base of the combustion chamber 4 through the fluidising nozzles 44 whilst char discharged from the devolatiliser 60 is supplied to the chamber through an inlet 78 subjacent the coal screw feeder 50.

The steam generating and superheating unit associated with the combustor 2 is connected to deliver steam to a steam turbine 80 driving an electric generator 82. A further electric generator 84 is connected to be driven by the gas turbine 70.

In operation, the devolatiliser is supplied through the inlet 64 and a lock hopper (not shown) with coal having a sufficiently high volatile content (that is above 10%-15% volatiles) and, through the inlet 76 with a stream of compressed hot air at 500° to 850° C. from the air heater tube bank 74. The combustible gases which result from the heating of the coal by the compressed hot air are discharged, through the outlet 66 and dust removal equipment (not shown), to the burner 68. In the burner 68 the combustible gases, at about 500° C., are mixed with a further stream of compressed hot air from the air heater tube bank 74 and burnt to produce combustion gases at about 800° C. to 1200° C. which pass through and drive the gas turbine 70. The exhaust gases from the gas turbine are discharged through the fluidising nozzles 44 at the base of the combustion chamber 4. Char from the devolatiliser 60 is discharged to the combustion chamber 4 through the inlet 76 together with a further supply of coal, if required to attain a desired heat output. Exhaust gases from the gas turbine 70 are supplied through the fluidising nozzles 44 and 52 to achieve a fluidisation velocity of about 10 meters per second with a rapid circulation and mixing effect enhancing combustion within the chamber.

The combustion gases at a temperature of up to 950° C. pass from the chamber, through the separation region 10, to the combustion gas pass 38 and over the evaporator and economiser tube banks 36, 34, 32 and 30 and then through a filter 90 prior to discharge to atmosphere through a stack 92.

The hot particles, at a temperature of up to 950° C., separated from the combustion gases at the separation region 10 are passed to the compartmented heat transfer bed space 20 through the weir chambers 14 and fluidised by air from the gas turbine driven compressor 72 to achieve a fluidising velocity of about 0.5 meters per second to circulate the hot particles around the tube banks.

The hot particles having given up heat to the tube banks in the heat transfer bed space are discharged with the fluidising air and recirculated to the combustion chamber 4. Spent limestone and ash particles are discharged from the base of the heat transfer bed space, through the ash disposal outlet 46.

The coal devolatiliser 60 normally operates in the temperature range of between 450° C. and 700° C. for the combustible gases discharged from the devolatiliser. Following combustion of the combustible gases from the devolatiliser in the burner 68 the temperature of the gases discharged to the gas turbine after tempering with cool air, if necessary, will be up to about 1200° C.—which is within the normal operating limit of commercially available gas turbines—and is likely to give rise to lower concentrations of alkali metals in the gases compared to gases resulting from complete combustion or gasification of the coal. Furthermore, since the devolatiliser only produces volatile gases and char (and not combustion gases), the gaseous discharge from the devolatiliser is relatively small in volume compared with the gaseous discharge from the complete plant and accordingly any deleterious small particles in the gaseous discharge from the devolatiliser may be removed without incurring large penalties in operating costs.

Since the gas turbine 70 is upstream, in the gas flow path, of the various water heating and steam generating and heating tube banks any failures of tubes in those banks will not affect operation of the gas turbine.

Control of the plant is achieved by regulating the supply of coal to the devolatiliser and to the combustion chamber.

As the gas turbine output falls, coal is supplied to the combustion chamber to supplement the reduced flow of char in order to maintain combustion conditions in the chamber. The temperature in the chamber can be lowered to 750° C., provided that the excess air level is maintained above 20%. The heat transfer bed spaces are compartmented in order that the fluidising control air may be adjusted between compartments. This controls the flow of solids through each compartment, which in turn alters the heat absorbed by the tube banks. In this manner the steam cycle and air heater are independently controlled, while maintaining the minimum solids recirculation rate to the combustion chamber.

The supply of combustible gases from the devolatiliser 60 may be supplemented, or temporarily replaced, by oil or gas firing of the burner 68.

Combustion gases from the burner 68 may be tempered with air from the compressor 72 in order to maintain the combustion gas temperature within the operating limits of the gas turbine 70.

We claim:

1. A power generation plant comprising a fluidized bed combustion chamber section of upright elongated form having, at a lower portion thereof, inlet means for fuel particles and relatively high velocity fluidizing gases and, at an upper portion thereof, an outlet, a separating section in communication with the outlet from the fluidized bed combustion chamber section and having an upper exit for separated combustion gases and a lower exit for separated solids particles, a heat transfer bed section connected to receive separated solids particles from the lower exit of the separating section and having a base portion and a fluidized bed portion, positioned in the base portion of the heat transfer bed section, nozzles connected for the discharge of relatively low velocity fluidizing gases, positioned in the fluidized bed portion of the heat transfer bed section, first and second heat transfer tube banks, transfer duct means connecting the heat transfer bed section to the lower portion of the fluidized bed combustion chamber, a coal devolatilization unit, a heated air duct connecting the first heat transfer tube bank in the heat transfer bed section to the coal devolatilization unit, a gas turbine, a combustible gases duct connecting the coal devolatilization unity through burner means to an inlet to the gas turbine, a char transfer duct connecting the coal devolatilization unit to the inlet means for fuel particles at the lower portion of the fluidized bed combustion chamber, a gas turbine exhaust gas duct connecting an outlet from the gas turbine to the inlet means for relatively high velocity fluidizing gases at the lower portion of the fluidized bed combustion chamber, a combustion gas pass extending from the upper exit from the separating section to a combustion gas discharge outlet, vapor generating and vapor superheating tube banks positioned in the combustion gas pass and connected in fluid flow relationship with the second heat transfer tube tank in the heat transfer bed section, and a super-heated vapor duct connecting the vapor superheating tube bank outlet to a vapor turbine.

2. A power generation plant as claimed in claim 1, wherein the heat transfer bed section is divided into a plurality of parallel flow compartments each arranged to be controllably supplied with fluidizing gases at a relatively low velocity.

3. A power generation plant as claimed in claim 1, wherein the separating section is divided into a plurality of parallel flow paths, spaced around the fluidized bed combustion chamber section, respectively discharging solids particles to the heat transfer bed section divided into corresponding parallel flow paths and combustion gases to a common offtake.

4. A power generation plant as claimed in claim 1, wherein the separating section is connected to the heat transfer bed section through a weir chamber section provided with fluidizing means adapted to effect transfer of the solids particles from the separating section to the heat transfer bed section.

5. A power generation plant as claimed in claim 1, wherein the gas turbine is drivingly coupled to an air compressor connected to deliver air to the first heat transfer tube bank.

6. A power generation plant as claimed in claim 5, wherein the air compressor is connected to deliver fluidizing air to the heat transfer bed section.

7. A power generation plant as claimed in claim 5, wherein the air compressor is connected to deliver tempering air to the connection between the burner means and the gas turbine.

8. A power generation plant as claimed in claim 5, wherein the burner is connected to receive air from the first heat transfer tube bank.

9. A power generation plant as claimed in claim 1, wherein the gas turbine and the vapor turbine are each connected to respective electrical generators.

* * * * *